United States Patent [19]

Sojka

[11] Patent Number: 5,712,358
[45] Date of Patent: Jan. 27, 1998

[54] PROCESS FOR PRODUCING AN OIL SORBENT COPOLYMER AND THE PRODUCT THEREOF

[75] Inventor: Milan F. Sojka, Algonquin, Ill.

[73] Assignee: Amcol International Corporation, Arlington Heights, Ill.

[21] Appl. No.: 811,129

[22] Filed: Mar. 3, 1997

Related U.S. Application Data

[63] Continuation-in-part of Ser. No. 486,107, Jun. 7, 1995, abandoned.

[51] Int. Cl.$^6$ ........................................... C08F 20/10
[52] U.S. Cl. ........................................... 526/323.2
[58] Field of Search ................................. 526/323.2

[56] References Cited

U.S. PATENT DOCUMENTS

| | | | |
|---|---|---|---|
| 3,493,500 | 2/1970 | Volk et al. | 210/54 |
| 3,658,772 | 4/1972 | Volk et al. | 260/80.3 N |
| 3,759,880 | 9/1973 | Hoffmann et al. | 260/80.3 R |
| 3,915,921 | 10/1975 | Schlatzer | 260/17.4 |
| 3,966,902 | 6/1976 | Chromecek | 424/59 |
| 3,992,562 | 11/1976 | Denzinger et al. | 526/208 |
| 4,013,825 | 3/1977 | Denzinger et al. | 526/208 |
| 4,136,250 | 1/1979 | Mueller et al. | 528/29 |
| 4,224,427 | 9/1980 | Mueller et al. | 526/93 |
| 4,250,322 | 2/1981 | Efimov et al. | 560/26 |
| 4,276,402 | 6/1981 | Chromecek et al. | 526/264 |
| 4,341,889 | 7/1982 | Deichert et al. | 528/26 |
| 4,374,126 | 2/1983 | Cardarelli et al. | 424/81 |
| 4,414,278 | 11/1983 | Cohen et al. | 428/402 |
| 4,423,099 | 12/1983 | Mueller et al. | 428/35 |
| 4,509,949 | 4/1985 | Huang | 586/558 |
| 4,543,398 | 9/1985 | Bany et al. | 525/474 |
| 4,675,426 | 6/1987 | Crivello | 526/194 |
| 4,709,767 | 12/1987 | Alexander | 175/65 |
| 4,724,240 | 2/1988 | Abrutyn | 514/847 |
| 4,794,140 | 12/1988 | Alexander | 524/827 |
| 4,873,091 | 10/1989 | Jankower et al. | 424/489 |
| 4,920,187 | 4/1990 | Kashihara et al. | 526/193 |
| 4,962,133 | 10/1990 | Chromecek et al. | 521/56 |
| 4,962,170 | 10/1990 | Chromecek et al. | 526/212 |
| 5,130,343 | 7/1992 | Frechet et al. | 521/62 |
| 5,135,989 | 8/1992 | Ziemelis et al. | 525/330.6 |
| 5,145,675 | 9/1992 | Won | 424/78.31 |
| 5,145,685 | 9/1992 | Carmody | 424/501 |
| 5,147,937 | 9/1992 | Frazza et al. | 525/243 |
| 5,158,772 | 10/1992 | Davis | 424/401 |
| 5,189,102 | 2/1993 | Tsubuko et al. | 525/254 |
| 5,206,159 | 4/1993 | Cohen et al. | 435/180 |

(List continued on next page.)

FOREIGN PATENT DOCUMENTS

| | | |
|---|---|---|
| 0 206 072 A2 | 12/1986 | European Pat. Off. |
| 0 301 532 A2 | 1/1989 | European Pat. Off. |
| 0 371 421 A2 | 6/1990 | European Pat. Off. |
| 9202-213 | 11/1984 | Japan. |
| 5-105729 | 4/1993 | Japan. |
| 5-140236 | 6/1993 | Japan. |
| 967051 | 8/1964 | United Kingdom. |
| 1 443 715 | 7/1973 | United Kingdom. |
| 2 090 264 | 7/1982 | United Kingdom. |

OTHER PUBLICATIONS

Lochhead et al., Encyclopedia of Polymers and Thickeners in Cosmetics, *Cosmetics and Toiletries*, vol. 108, May 1993 at pp. 95–138.

Yoshikazu et al., "New Emulsion System—Polymeric 'Water in Water' Emulsion," *Contemp. Topics in Polymer Sci.*, 14 575–586 (1984).

Davidson et al., "Microrheology of Thickened Suspensions," *J. Colloid and Interface Science*, vol. 55, 163–169 (1975).

BF Goodrich Product Description "Carbopol® Water Soluble Resins," pp. 1–35.

DuPont Product Brochure, "VAZO® Polymerizations Initiators, Uses, Storage and Handling," pp. 1–16 (Jul. 1984).

Dow Corning Product Brochure, "Information About Dow Corning Silicone Fluids", 200® Fluid, 0.65cs and 200® Fluid, 1.0cs, (1993).

Dow Corning Product Brochure, "Information About Dow Corning Silicon Fluids", 200® Fluid, 1.5cs; 200® Fluid, 2.0cs; and 200® Fluid, 5.0cs (1993).

Hüls America Inc. Product Brochure on Silicones, at pp. 16, 270, 271, 274, 275, and 298.

Dow Corning Product Brochure, "Information About Volatile Silicone Fluids," Dow Corning® 224, 245, 344, and 345 Fluids, 200® Fluid (0.65cs) from Dow Corning Corporation (1993).

*Primary Examiner*—Joseph L. Schofer
*Assistant Examiner*—N. Sarofim
*Attorney, Agent, or Firm*—Marshall, O'Toole, Gerstein, Murray & Borun

[57] ABSTRACT

The present invention is directed to a porous copolymer micro-particle having a high oil absorbency. The method of the present invention comprises the steps of:

dissolving at least two polyunsaturated monomers in a water-immiscible organic solvent to provide a monomer mixture containing at least about 60%, preferably about 100% by weight polyunsaturated monomers;

adding the monomer mixture to an aqueous solution, preferably having an effective amount of a suspension stabilizer dissolved therein, to form an organic/aqueous biphasic liquid system;

vigorously agitating the biphasic liquid system at a rate sufficient to cause the water immiscible organic phase to be suspended as micro-droplets in the aqueous phase;

continuing vigorous agitating during polymerization of the monomers in the suspended micro-droplets to produce a microporous polymer micro-particle; and separating the microporous polymer micro-particle from the organic solvent to produce a microporous and oil sorbent polymer micro-particle having a mean unit diameter of less than about 25 microns.

19 Claims, 1 Drawing Sheet

U.S. PATENT DOCUMENTS

| | | | |
|---|---|---|---|
| 5,208,038 | 5/1993 | Gressani et al. | 424/489 |
| 5,209,932 | 5/1993 | Nichols | 424/409 |
| 5,223,251 | 6/1993 | Nichols | 424/69 |
| 5,223,267 | 6/1993 | Nichols | 424/489 |
| 5,238,736 | 8/1993 | Tseng et al. | 428/327 |
| 5,246,972 | 9/1993 | Cifuentes et al. | 521/54 |
| 5,261,169 | 11/1993 | Williford | 36/43 |
| 5,288,814 | 2/1994 | Long, II et al. | 525/450 |
| 5,292,835 | 3/1994 | Jahns et al. | |
| 5,316,774 | 5/1994 | Eury et al. | 424/501 |
| 5,320,835 | 6/1994 | Pahlck et al. | 424/64 |
| 5,330,822 | 7/1994 | Berg et al. | 428/192 |
| 5,336,740 | 8/1994 | Eian | 526/194 |
| 5,348,621 | 9/1994 | Rudy | 162/100 |
| 5,382,433 | 1/1995 | Pahlck et al. | 424/401 |
| 5,422,117 | 6/1995 | Morton et al. | 424/436 |
| 5,422,361 | 6/1995 | Munayyer et al. | 514/408 |
| 5,458,890 | 10/1995 | Williford et al. | 426/3 |
| 5,460,725 | 10/1995 | Stringfield | 210/690 |
| 5,498,678 | 3/1996 | Steffier | 526/200 |
| 5,510,117 | 4/1996 | Abate | 424/489 |
| 5,539,071 | 7/1996 | Steffier | 526/208 |

PROCESS FOR PRODUCING AN OIL SORBENT COPOLYMER AND THE PRODUCT THEREOF

CROSS REFERENCE TO RELATED APPLICATION

This application is a continuation-in-part of application Ser. No. 08/486,107 filed Jun. 7, 1995, now abandoned.

BACKGROUND OF THE INVENTION

A. Field of the Invention

The present invention relates to a process for producing an oil sorbent polymer in micro-particle form. More particularly, the present invention relates to a process for producing a highly porous and highly cross-linked hydrophobic polymer characterized by a mean unit particle size of about 1 to about 102 microns and an oil sorbency of 72% by weight or greater. The present invention is also directed to the oil sorbent micro-particles produced by the process. The micro-particles produced by the process of the present invention are capable of holding and releasing oleophilic and hydrophilic oils, creams, cleaners, medicaments and other organic active and hydrophilic active compounds and compositions for use in the cosmetic, cleaning, chemical process and pharmaceutical industries.

B. Background

Early disclosures of polymer particles appear in U.S. Pat. Nos. 3,493,500 and 3,658,772, which issued on Feb. 3, 1970 and Apr. 25, 1972, respectively. They teach the production of aqueous suspensions of polymer particles from acrylic acid monomer and/or acrylamide monomer in an aqueous reaction medium at pH 1–4. Both patents teach that the resultant polymer suspensions, which were not characterized as to particle size or structure, were suitable for use as flocculating agents for sewage treatment.

It was subsequently discovered that polymers could be made in a porous particulate form by a variety of techniques. The art has stated that "the type of polymerization technique used is an important factor in the determination of the resulting product." See U.S. Pat. No. 4,962,170 at column 2, line. 4. As stated in the '170 patent at column 2, lines 7–11, "within each type of polymerization, there are procedural alternatives which can have significant impact on the resulting product" "[t]he differences in the polymerization techniques are enough that a procedure used in one type of polymerization technique that will not necessarily have the same effect if used in another polymerization technique." Thus, there is a significant degree of unpredictability in the art.

Porous polymeric particles are capable of being prepared by one of two processes—precipitation polymerization in a single solvent system, or suspension polymerization in a two phase liquid system. The precipitation polymerization technique is presented in U.S. Pat. Nos. 4,962,170 and 4,962,133 both of which issued on Oct. 9, 1990. The '170 patent discloses a precipitation polymerization process wherein the disclosed monomers are soluble in the single solvent system, whereas the resulting polymer, which is insoluble, precipitates out of solution once a critical size is obtained. In the '170 process, the solution of monomer consists exclusively of one or more types of polyunsaturated monomer. Because each monomer is polyunsaturated, each monomer also functions as a cross-linker, resulting in a highly cross-linked polymer particle.

Like the '170 patent, the '133 patent also utilizes the precipitation polymerization process for producing a porous polymeric particle. However, unlike the '170 process, wherein the monomer solution consists exclusively of polyunsaturated monomers, the '133 process discloses the monomer solution may include one monosaturated monomer in combination with one polyunsaturated monomer, wherein the polyunsaturated monomer may comprise up to 90% by weight of the total weight of monomers.

U.S. Pat. No. 5,316,774 is directed to a suspension polymerization process, again limited to a maximum of 90% by weight polyunsaturated monomers based on the total weight of monomers. Accordingly, it is an object of the present invention to provide a process for making sorbent micro-particles from a monomer solution that contains more than 90% by weight, preferably about 92% to 100% polyunsaturated monomers, by weight based on the total weight of monomers in the monomer solution.

The '133 process is limited to a solvent system that is an aqueous/organic azeotrope. Because the organic solvent cannot be separated from the water in an azeotrope, azeotropic solutions present special waste disposal problems. Accordingly, it is an object of the present invention to provide a process for making sorbent micropolymers that does not require an azeotropic solution. Further, the particles produced by the '133 process range extensively in size from less than about 1 micron in average diameter for unit particles to about twelve hundred microns in average diameter for clusters of fused aggregates. The large variability in size limits the utility and properties of the polymeric particles. Accordingly, it is also an object of the present invention to discover a process for making polymeric microparticles of a less diverse size.

Another process disclosed in the art for producing microscopic polymers is in situ suspension polymerization wherein the precipitating agent is the active ingredient around which polymerization occurs. Examples of in situ suspension polymerization include U.S. Pat. No. 4,724,240 wherein polymerization of a monounsaturated monomer and a polyunsaturated monomer in an aqueous/polyvinylpyrrolidone system containing an emollient, as the active agent, produced relatively large micro-particles, having a mean diameter "between 0.25 to 0.5 mm" (250 to 500 microns) that already contain the emollient therein. A problem with a particle having a mean diameter of 250–500 microns is that the particle is capable of being sensed by touch. This is an undesirable property if the particle is to be used in a lotion or cream or other cosmetic formulations. Accordingly, it is also an object of the present invention to provide a process that is capable of manufacturing polymeric particles having a smaller mean diameter for a smoother feel.

A second problem with the process of the '240 patent is that it is limited to those active ingredients that are capable of dissolving in the solvent. Further, the active ingredient(s), which may be proprietary, must be provided in bulk to the polymer manufacturer so that they may become trapped in the particles during the polymerization process. To overcome these problems, it is a further object of the present invention to provide polymeric micro-particles having evacuated pores that are capable of imbibing hydrophobic fluids in large amounts so that they may be loaded with active proprietary ingredient(s) by any individual manufacturer who incorporates them as release agents in their technology.

A third problem with the '240 process is that it is not suited for use when the active ingredient is a mixture of components that differ significantly from one another as to oleophilicity. In such a situation, the more oleophilic of the active ingredients would be selectively isolated in the pores of the polymer made by the '240 process. To overcome this problem, the '240 process would have to be separately applied to each of the active ingredients, and thereafter, the resulting products would be mixed. However, such additional processing and mixing is costly. Accordingly, it is a further object of the present invention to provide a process for producing a micro-particle wherein the micro-particle is capable of receiving a plurality of active ingredients.

SUMMARY OF THE INVENTION

It was unexpectedly discovered that the process of the present invention is capable of producing micro-particles that have not only a high oil adsorbency, but that also exhibit a substantially uniform particle size.

The present invention is directed to a process for making a porous polymer of micro-particulate size that exhibits a high oil sorbency. The method of the present invention comprises the steps of:

dissolving at least two polyunsaturated monomers along with an effective amount of an organic polymerization initiator in a water-immiscible organic solvent to provide a monomer mixture;

adding the monomer mixture to an aqueous solution preferably having an effective amount of a suspension stabilizer dissolved therein to form an organic/aqueous biphasic liquid system;

vigorously agitating the biphasic liquid system at a rate sufficient to cause the water immiscible organic phase to be suspended as micro-droplets in the aqueous phase;

continuing vigorous agitation during polymerization of the monomers in the suspended micro-droplets to produce a microporous polymer micro-particle; and separating the microporous polymer micro-particle from the organic solvent to produce a microporous and oil sorbent polymer micro-particle having a mean unit diameter of less than about 25 microns and a total sorptive capacity for mineral oil that is 72% by weight or greater, calculated as percent adsorbed oil, based on total weight of polymer plus adsorbed oil.

The present invention is further directed to a microporous, oleophilic and hydrophilic material adsorbent micro-particles comprising a polymer comprising at least two polyunsaturated monomers, the micro-particle characterized by having a mean unit diameter of less than about 50 microns, preferably less than about 25 microns and a total sorption capacity for mineral oil that is 72% by weight or greater, preferably at least about 80%. In a preferred embodiment, the micro-particles of the present invention are characterized by a mean unit diameter from about 1 to about 50 microns, more preferably from about 1 to about 20 microns, most preferably, from about 1 to about 16 microns, or less than about 20 microns.

DETAILED DESCRIPTION OF THE INVENTION

Figure 1:
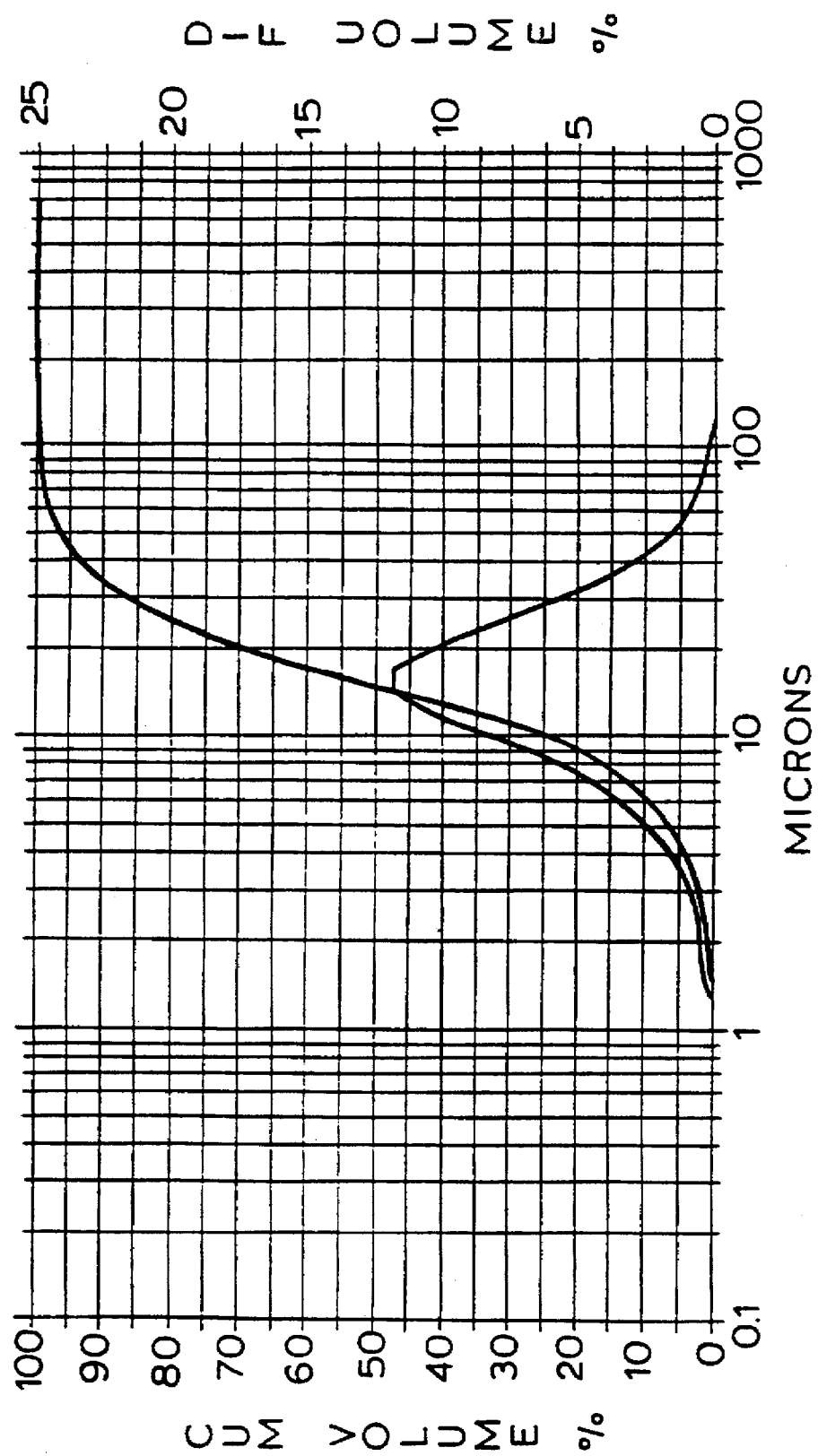
FIG. 1 is a particle size distribution analysis of a mixture of several of the micro-particle products produced by the process of the present invention as measured on a MICROTRAC Full Range Particle Analyzer, (Ver. 4.12), reflecting a spread of about 100 microns, a mean unit diameter of about 15 microns, and that 80% of the particles in the mixture have a size between 6.2 and 32.7 microns.

The present invention has two aspects. In its first aspect, it is directed to a process for making a polymer in a porous micro-particle form that is capable of sorbing high volumes of oleophilic and hydrophilic liquids. The process of the present invention comprises the steps of:

dissolving at least two polyunsaturated monomers, preferably along with an effective amount of an organic polymerization initiator in a water-immiscible organic solvent to provide a monomer mixture;

adding the monomer mixture to an aqueous solution preferably having an effective amount of a suspension stabilizer dissolved therein to form an organic/aqueous biphasic liquid system;

vigorously agitating the biphasic liquid system at a rate sufficient to cause the water immiscible organic phase to be suspended as micro-droplets in the aqueous phase, e.g., at a tip speed of about 1 to about 15 meters per second, preferably about 5 to about 10 meters per second, more preferably at about 8 meters per second;

continuing said vigorous agitation during polymerization of the monomers in the suspended micro-droplets to produce a microporous polymer micro-particle; and separating the microporous polymer micro-particle from the organic solvent to produce a microporous and oil sorbent polymer micro-particle having a mean unit diameter of less than about 25 microns and a total sorptive capacity for mineral oil that is 72% by weight or greater, based on the total weight of adsorbed oil plus polymer.

The term "sorptive" (or "sorption") is used herein to refer to the capability or capacity of the micro-particles of the present invention to both adsorb and absorb oleophilic and hydrophilic materials. In discussing micro-particles, the art loosely uses the term "adsorptive," such as in "total adsorptive capacity" or in "free flowing adsorptive capacity." However, it is understood that references in the art to "total adsorptive capacity" inherently include the total of absorptive and adsorptive capacities of a particle, unless otherwise defined. Likewise, preferences in the art to "free flowing adsorptive capacity" also inherently include both the absorptive and adsorptive capacities.

The process of the present invention copolymerizes at least two polyunsaturated (polyethylenically unsaturated) monomers, preferably allyl methacrylate, and an ethylene glycol dimethacrylate. Both the allyl methacrylate and the ethylene glycol dimethacrylate are diunsaturated monomers. The diunsaturated monomers also function as cross-linking agents.

The highly cross-linked polymeric micro-particles of this invention are prepared by polymerizing monomers having at least two unsaturated bonds (hereinafter referred to as "polyunsaturated" monomers) said monomers being polymerized including no more than about 40%, preferably no more than about 9% by total monomer weight of monounsaturated comonomers. Examples of polyunsaturated monomers can be poly-acrylates ("poly" meaning two or more), -methacrylates, or -itaconates of: ethylene glycol, propylene glycol; di-, tri-, tetra-, or poly-ethylene glycol and propylene glycol; trimethylol propane, glycerine, erythritol, xylitol, pentaerythritol, dipentaerythritol, sorbitol, mannitol, glucose, sucrose, cellulose, hydroxyl cellulose, methyl cellulose, 1,2 or 1,3 propanediol, 1,3 or 1,4 butanediol, 1,6 hexanediol, 1,8 octanediol, cyclohexanediol, or cyclohexanetriol. Similarly, bis(acrylamido or methacrylamido) compounds can be used. These compounds are, for example, methylene bis(acryl or methacryl)amide, 1,2 dihydroxy ethylene bis(acryl or methacryl)amide, hexamethylene bis (acryl or methacryl)amide.

Another group of useful monomers could be represented by di or poly vinyl esters, such as divinyl propylene urea, divinyl-oxalate, -malonate, -succinate, -glutamate, -adipate, -sebacate, -maleate, -fumerate, -citraconate, and -mesaconate.

Other suitable polyunsaturated monomers include divinyl benzene, divinyl toluene, diallyl tartrate, allyl pyruvate, allyl maleate, divinyl tartrate, triallyl reelamine, N,N'-methylene bis acrylamide, glycerine dimethacrylate, glycerine trimethacrylate, diallyl maleate, divinyl ether, diallyl monoethyleneglycol citrate, ethyleneglycol vinyl allyl citrate, allyl vinyl maleate, diallyl itaconate, ethyleneglycol diester of itaconic acid, divinyl sulfone, hexahydro 1,3,5-triacryltriazine, triallyl phosphite, diallyl ether of benzene phosphonic acid, maleic anhydride triethylene glycol polyester, polyallyl sucrose, polyallyl glucose, sucrose diacrylate, glucose dimethacrylate, pentaerythritol di-, tri- and tetra- acrylate or methacrylate, trimethylol propane di- and triacrylate or methacrylate, sorbitol dimethacrylate, 2-(1-aziridinyl)-ethyl methacrylate, tri-ethanolamine diacrylate or dimethacrylate, triethanolamine triacrylate or trimethacrylate, tartaric acid dimethacrylate, triethyleneglycol dimethacrylate, the dimethacrylate of bis-hydroxy ethylacetamide and the like.

Other suitable polyethylenically unsaturated cross-linking monomers include ethylene glycol diacrylate, diallyl phthalate, trimethylolpropanetrimethacrylate, polyvinyl and polyallyl ethers of ethylene glycol, of glycerol, of pentaerythritol, of diethyleneglycol, of monothio- and dithio-derivatives of glycols, and of resorcinol; divinylketone, divinylsulfide, allyl acrylate, diallyl fumarate, diallyl succinate, diallyl carbonate, diallyl malonate, diallyl oxalate, diallyl adipate, diallyl sebacate, diallyl tartrate, diallyl silicate, triallyl tricarballylate, triallyl aconitrate, triallyl citrate, triallyl phosphate, divinyl naphthalene, divinylbenzene, trivinylbenzene; alkyldivinylbenzenes having from 1 to 4 alkyl groups of 1 to 2 carbon atoms substituted on the benzene nucleus; alkyltrivinylbenzenes having 1 to 3 alkyl groups of 1 to 2 carbon atoms substituted on the benzene nucleus; trivinylnaphthalenes, and polyvinylanthracenes. In addition, acryl or methracryl end-capped siloxanes and polysiloxanes, methacryloyl end-capped urethanes, urethane acrylates of polysiloxane alchols and bisphenol A bis methacrylate and ethoxylated bisphenol A bis methacrylate also are suitable as polyunsaturated monomers.

Still another group of monomers is represented by di or poly vinyl ethers of ethylene, propylene, butylene, and the like, glycols, glycerine, penta erythritol, sorbitol, di or poly allyl compounds such as those based on glycols, glycerine, and the like, or combinations of vinyl allyl or vinyl acryloyl compounds such as vinyl methacrylate, vinyl acrylate, allyl methacrylate, allyl acrylate, methallyl methacrylate, or methallyl acrylate. In addition, aromatic, cycloaliphatic and heterocyclic compounds are suitable for this invention. These compounds include divinyl benzene, divinyl toluene, divinyl diphenyl, divinyl cyclohexane, trivinyl benzene, divinyl pyridine, and divinyl piperidine. Furthermore, divinyl ethylene or divinyl propylene urea and similar compounds may be used, e.g., as described in U.S. Pat. Nos. 3,759,880; 3,992,562; and 4,013,825, which are hereby incorporated by reference. Acryloyl- or methacryloyl end-capped siloxane and polysiloxanes such as those described in U.S. Pat. Nos. 4,276,402; 4,341,889, French Patent 2,465, 236, and German Publication GER OLS Patent 3,034,505, which are hereby incorporated by reference, are suitable for this invention. Methacryloyl end-capped urethanes, such as those described in U.S. Pat. No. 4,224,427; 4,250,322; and 4,423,099, German Publications GER OLS No. 2,365,631 and 2,542,314, Japanese Patent Application Nos. 85/233, 110; 86/09,424, and 86/30,566, and British Patent 1,443, 715, are suitable for this invention. Urethane acrylates of polysiloxane alcohols as described in U.S. Pat. Nos. 4,543, 398 and 4,136,250 and bisphenol A bis methacrylate and ethoxylated bisphenol A bis methacrylate are also suitable monomers for this invention.

Monoethylenically unsaturated monomers suitable, in an mount up to about 40%, preferably no more than about 9% by weight, based on the total weight of monomers, for preparing polymer micro-particles include ethylene, propylene, isobutylene, disobutylene, styrene, vinyl pyridine ethylvinylbenzene, vinyltoluene, and dicyclopentadiene; esters of acrylic and methacrylic acid, including the methyl, ethyl, propyl, isopropyl, butyl, sec-butyl, tert-butyl, amyl, hexyl, octyl, ethylhexyl, decyl, dodecyl, cyclohexyl, isobornyl, phenyl, benzyl, alkylphenyl, ethoxymethyl, ethoxyethyl, ethoxyproyl, propoxymethyl, propoxyethyl, propoxypropyl, ethoxyphenyl, ethoxybenzyl, and ethoxycyclohexyl esters; vinyl esters, including vinyl acetate, vinyl propionate, vinyl butyrate and vinyl laurate, vinyl ketones, including vinyl methyl ketone, vinyl ethyl ketone, vinyl isopropyl ketone, and methyl isopropenyl ketone, vinyl ethers, including vinyl methyl ether, vinyl ethyl ether, vinyl propyl ether, and vinyl isobutyl ether; and the like.

Other monounsaturated monomer materials which may be utilized in accordance with the present invention, in an amount up to about 9% by weight, based on the total weight of monomers in the monomer solution, include hydroxy alkyl esters of alpha, beta-unsaturated carboxylic acids such as 2-hydroxy ethylacrylate or methacrylate, hydroxypropylacrylate or methacrylate and the like. Many derivatives of acrylic or methacrylic acid other than the esters mentioned are also suitable as starting monounsaturated monomer materials for use in forming the unsaturated polymer microparticles of the present invention. These include, but are not limited to the following monomers: methacrylylglycolic acid, the monomethacrylates of glycol, glycerol, and of other polyhydric alcohols, the monomethacrylates of dialkylene glycols and polyalkylene glycols, and the like. The corresponding acrylates in each instance may be substituted for the methacrylates. Examples include the following: 2-hydroxyethyl acrylate or methacrylate, diethylene glycol acrylate or methacrylate, 2-hydroxypropyl acrylate or methacrylate, 3-hydroxypropyl acrylate or methacrylate, tetraethyleneglycol acrylate or methacrylate, pentaethyleneglycol acrylate or methacrylate, dipropyleneglycol acrylate or methacrylate, acrylamide, methacrylamide, diacetone acrylamide methylolacrylamide methylolmethacrylanide and any acrylate or methacrylate having one or more straight or branched chain alkyl groups of 1 to 30 carbon atoms, preferably 5 to 18 carbon atoms, and the like. Other suitable examples include isobornyl methacrylate, phenoxyethyl methacrylate, isodecyl methacrylate, stearyl methacrylate, hydroxypropyl methacrylate, cyclonexyl methacrylate, dimethylaminoethyl methacrylate, t-butylaminoethyl methacrylate, 2-acrylamido propane sulfonic acid, 2-ethylexyl methacrylate, methyl methacrylate, ethyl methacrylate, butyl methacrylate, 2-hydroxyethyl methacrylate, tetrahydrofurfuryl methacrylate and methoxyethyl methacrylate.

Examples of monounsaturated monomers containing carboxylic acid groups as functional groups and suitable for use as starting materials in accordance with the invention include the following: acrylic acid, methacrylic acid, itaconic acid, aconitic acid, cinnamic acid, crotonic acid, mesaconic acid, maleic acid, fumaric acid and the like.

Partial esters of the above acids are also suitable as monosaturated monomers for use in accordance with the invention. Instances of such esters include the following: mono-2-hydroxypropyl aconitate, mono-2-hydroxyethyl maleate, mono-2-hydroxypropyl fumarate, mono-ethyl itaconate, monomethyl cellosolve ester of itaconic acid, monomethyl cellosolve ester of maleic acid, and the like.

Instances of suitable monounsaturated monomers containing amino groups as functional groups include the following: diethylaminoethyl acrylate or methacrylate, dimethylaminoethyl acrylate or methacrylate, monoethylaminoethyl acrylate or methacrylate, tert. butylaminoethyl methacrylate, para-amino styrene, ortho-amino styrene, 2-amino-4-vinyl toluene, piperidinoethyl methacrylate, morpholinoethyl methacrylate, 2-vinyl pyridine, 3-vinyl pyridine, 4-vinyl pyridine, 2-ethyl-5-vinyl pyridine, dimethylaminopropyl acrylate and methacrylate, dimethylaminoethyl vinyl ether, dimethylaminoethyl vinyl sulfide, diethylaminoethyl vinyl ether, amonoethyl vinyl ether, 2-pyrrolidinoethyl methacrylate, 3-dimethylaminoethyl-2-hydroxy-propyl acrylateormethacrylate, 2-aminoethyl acrylate or methacrylate, isopropyl methacrylamide, N-methyl acrylamide or methacrylamide, 2-hydroxyethyl acrylamide or methacrylamide, 1-methacryloyl-2-hydroxy-3-trimethyl ammonium chloride or sulfomethylate, 2-(1-aziridinyl)-ethyl methacrylate, and the like. Polyethylenically unsaturated monomers which ordinarily act as though they have only one unsaturated group, such as isopropene, butadiene and chloroprene, should not be calculated as part of the polyunsaturated monomer content, but as part of the monoethylenically unsaturated monomer content.

The process of the present invention preferably utilizes an effective amount of an organic polymerization initiator to cause polymerization to occur in the organic phase solvent. However, other methods of initiating polymerization may be used instead, such as UV light, actinic radiation, or the like. By way of example, suitable organic initiators include the organic peroxide initiators, such as dibenzoyl peroxide or t-butyl peroctoate, or the azo initiators. Preferred initiators are the azo initiators such as 2,2'-azobisisobutyronitrile and 2,2'-azobis (2,4-dimethylpentanenitrile). An especially preferred azo initiator is 2,2'-azobis(2,4-dimetylpentanenitrile), which is commercially available under the tradename VAZO 52 from DuPont, Wilmington, Del. A typical effective amount of organic initiator relative to dry monomer was found to be about 0.5–2% by weight, preferably about 1–1.2% by weight.

Examples of redox systems, include secondary or tertiary amines and amine (preferably tertiary) and peroxide combinations. The ratio between the peroxide and the amine may vary from 0.1 to 5 moles of amine per mole of peroxide. It is useful to first dissolve the peroxide in a part of the solvent, and separately dissolve the amine in the other part of the solvent, then mix the peroxide part with the monomer solution at room temperature and, subsequently, add the amine part. The charging of the peroxide and amine part can be done at the beginning of the reaction or in portions throughout the reaction period. These mines are generally of the formula $R_2NH$ or $R_3N$ wherein R is an alkyl or substituted alkyl, cycloalkyl, or aryl group. Preferably the amine is a tertiary amine.

Illustrative reducing agents of this invention are methylbutyl amine, bis(2-hydroxyethyl)butyl amine, butyldimethyl amine, dimethyl amine, dibenzylethyl amine, diethylmethyl amine, dimethylpentyl amine, diethyl amine, 2,2',2"-trihydroxy dipropyl ethyl amine, di-n-propylene amine, 2,2', 2"-trimethyl tributyl amine, triethyl amine, dimethyl aminoacetal, pentylhexyl amine, triethanolamine, trihexyl amine, trimethyl amine, trioctadecyl amine, tripropyl amine, trisopropyl amine, tetramethylene diamine, and esters of para-amino benzoic acid, e.g., p-dimethyl amino-2-ethylhexyl-benzoate, dimethyl aminoethyl acetate, 2-(n-butoxy)ethyl 4-dimethylaminobenzoate, 2-(dimethylamino) ethyl benzoate, ethyl-4-dimethylaminobenzoate, methyldiethanolamine, dibutyl amine, N,N-dimethylbenzylamine, methylethyl amine, dipentyl amine and peroxide $Fe^{2+}$.

Other preferred initiators are selected from inorganic initiators such as sodium, potassium, or ammonium persulfates, and hydrogen peroxide.

In the preferred process of the present invention, the monomers and the organic initiator are dissolved in a substantially water-immiscible organic solvent porogen to produce the organic phase. Suitable substantially water-immiscible organic solvents include the aliphatic and aromatic hydrocarbons. Typical of these solvents are toluene, cyclohexane, silicone solvents, including fluoro silicones, chlorinated solvents, such as trichlorethylene, tetrachlormethane; dichlormethane, and the like, and one or more of the heptanes, alone or in combination. Based upon considerations of boiling point, volatility, toxicity, and solubility, a heptane is the more preferred solvent; most preferably, n-heptane.

Polymerization is accomplished by dissolving the monomers or their mixtures in a solvent which does not swell or dissolve the resulting polymer. Based on the parts by weight of the monomer and the solvent totalling 100 parts by weight, the monomers are used from 0.1 to less than about 25 parts by weight, preferably, from about 2 to less than about 25 parts by weight, and, more preferably, from about 5 to about 20 parts by weight. Correspondingly, the solvent is present from greater than about 75 parts by weight to about 99.9 parts by weight, preferably, from greater than about 75 parts by weight to about 98 parts by weight, and, most preferably, from about 80 parts by weight to about 95 parts by weight. No surfactant or dispersing aid is required. In the majority of cases, alcohols can be used as the monomer solvent.

Preferably the solvent is relatively volatile, having a boiling point of less than about 200° C., preferably less than about 180° C. at one atmosphere and is water-miscible. The removal of the solvent can be accomplished by evaporation, e.g., by heat and/or vacuum. The polymer can be washed with a suitable solvent, e.g., the same solvent used in polymerization, before it is dried.

Suitable solvents include a wide range of substances, notably inert, non-polar organic solvents. Some examples include are alkanes, cycloalkanes, and aromatics. Specific examples of such solvents are alkanes of from 5 to 12 carbon atoms, straight or branched chain cycloalkanes of from 5 to 8 carbon atoms, benzene, and alkyl-substituted benzenes, such as toluene and the xylenes.

Solvents of other types include $C_4$–$C_{20}$ alcohols, perfluoro polyethers, and silicone oils. Examples of silicone oils are polydimethylcyclosiloxane, hexamethyldisiloxane, cyclomethicone, dimethicone, amodimethicone, trimethylsilylamodimethicone, polysiloxane-polyalkyl copolymers (such as stearyl dimethicone and cetyl dimethicone), dialkoxydimethylpolysiloxanes (such as stearoxy dimethicone), polyquarternium 21, dimethicone propyl PG-betaine, dimethicone copolyol and cetyl dimethicone copolyol. Removal of the solvent may be effected by solvent extraction, evaporation, or similar conventional operations.

The process of the present invention also utilizes an aqueous phase. The aqueous phase comprises an aqueous solution preferably (optionally) having an effective amount of a suspension stabilizer dissolved therein. Suspension stabilizers are well known in the art. Suitable suspension stabilizers include starch, gum arabic, polyvinyl alcohol, sodium polymethacrylate, magnesium silicate, sodium bentonite clay, and methyl cellulose, magnesium hydroxide ($M_g(OH)_2$); polyvinylpyrrolidone (PVP); polyvinyl alcohol (PVOH); calcium phosphate; magnesium phosphate; lignites. A preferred suspension stabilizer is methyl cellulose, such as is commercially available from Dow Chemical Company, Midland, Mich., under the tradename Methocel A4C Premium.

In performing the process of the present invention, the organic phase is combined under an inert (e.g., argon or nitrogen) atmosphere with an aqueous phase. The combination is typically performed at about room temperature (about 23° C.). The combined phases must be vigorously stirred. The stirring may commence during or after the combination of the two phases. Preferably, the vigorous stirring is employed during the combination of the two phases. More preferably, the organic phase is added slowly with vigorous stirring or vigorous agitation to a larger volume of the aqueous phase. By the phrase "vigorous agitation" as used herein is meant that the stirring rod or impeller is rotated between about 800-2000 revolutions per minute ("rpm"), preferably at about 1400-1600 rpm. The function of the vigorous agitation is to facilitate the separation of the organic phase into micro-droplets, that with the aid of the suspension stabilizer, become isolated from one another as discrete mini-reaction vessels that are surrounded by water. In the process of the present invention, the water functions not only to separate the micro-droplets but also as a heat transfer vehicle for the transfer of heat to micro-droplets of monomers to initiate the exothermic polymerization reactions occurring in each micro-droplet.

The polymerization reaction is allowed to proceed in the vigorously agitated reaction mixture by raising the reaction temperature. As disclosed in Example 1, at about 46° C., some precipitation was observed in the stirred reaction mixture. At about 53° C., massive polymerization was observed. The mixture is then preferably heated to 75° C. to drive the polymerization reaction to completion.

Once polymerization is completed, the resulting microporous polymer micro-particles are separated from the reaction mixture, such as by filtering or by screening. At this point, however, the separated particles are filled with the water-immiscible organic solvent of the reaction mixture. By selecting an organic solvent that is also volatile, the solvent is readily removed from the pores of the copolymer particles, preferably by steam distillation or other washing process, such as vacuum distillation. Once the microporous polymer micro-particles have been separated from the water-immiscible organic solvent, such that their lipophilic micropores are now evacuated, they become the microporous and oil sorbent copolymer micro-particles of the present invention. Alternatively, the organic solvent can remain in place as an active material (in situ suspension polymerization).

Thus, the present invention is also directed to a composition of matter—a microporous and oleophilic and hydrophilic adsorbent microparticle comprising a polymer formed by copolymerizing at least two polyunsaturated monomers (each containing at least two carbon to carbon double bonds) optionally including one or more monounsaturated monomers, in an amount up to about 40%, preferably no more than about 9% by weight, based on the total weight of monomers, the micro-particle characterized by having a mean unit diameter of less than about 50 microns, preferably less than about 25 microns and a total sorption capacity for mineral oil that is at least about 72% by weight, preferably at least about 80% by weight, based upon the total weight of the polymer plus adsorbed mineral oil. The phrase mean "unit diameter" refers to mean diameter of the individual particle and not to the diameter of agglomerates which may form from time to time due to static charge or otherwise. The mean unit diameter of the micro-particle is more preferably from about 1 to about 20 microns; most preferably, from about 1 to about 16 microns.

A typical particle size distribution spans about 100 microns with particles generally not less than 1 micron in size. See, for example, FIG. 1. FIG. 1 is a particle size distribution of a mixture of several of the micro-particle products produced in accordance with the Examples herein, reflecting a spread of about 100 microns; a mean unit diameter of about 15 microns; that 80% of the micro-particles in the mixture have a size between 6.2 and 32.7 microns and a minimum size of at least 1 micron.

Preferably, the micro-particle of the present invention has a total sorption capacity for mineral oil of about 74% by weight or greater; more preferably, about 76% by weight or greater; most preferably about 78-93% by weight or greater, based on the total weight of polymer plus mineral oil. It is not expected that the sorption capacity of the polymers of the present invention for light mineral oil would exceed about 95% by weight.

The micro-particles of the present invention appear as a white powder and constitute free flowing discrete solid particles even when loaded with a oleophilic and/or hydrophilic material to their "free flowing" sorption capacity. In a preferred microporous and oil sorbent micro-particle of the present invention, a butyl methacrylate monounsaturated monomer is copolymerized with two diunsaturated monomers—one of the polyunsaturated monomers being an ethylene glycol dimethacrylate, preferably monoethylene glycol dimethacrylate. The preparation of such a micro-particle is described in Example 1 herein, wherein the other diunsaturated monomer is allyl methacrylate and the mole ratio of butyl methacrylate: allyl methacrylate: monoethylene glycol dimethacrylate was within a preferred molar ratio of monomers of 1:3 to 5:5 to 7, respectively, more preferably about 1:4:6.1.

Table I compares the oil adsorption of the (terpolymer) micro-particle of Example 1 to the reported oil adsorption for the copolymer micro-particles of U.S. Pat. No. 4,962,133, and to that of a commercially available oil sorbent product. The data relative to the copolymers of U.S. Pat. No. 4,962,133 was selected because the '133 copolymers employ a monounsaturated monomer and a diunsaturated monomer. Table I establishes that the polymers of the present invention, containing at least two polyunsaturated monomers, have a superior total adsorption capacity for mineral oil over both copolymers of BMA/EGDM and a commercially available copolymer (MMA/EGDM). In particular, the polymer of Example 1 exhibited a total sorption capacity for mineral oil of 78.3% by weight, compared to 72.2% by weight for the best reported BMA/EGDM copolymer of the prior art and 64% by weight for the commercially available product (Dow Corning Product No. 5640).

The abbreviations used herein and in Table I are identified as follows:

BMA butyl methacrylate
EGDMA monoethylene glycol dimethacrylate
AMA allyl methacrylate
MMA methyl methacrylate

TABLE I

| Monomers | Mole Ratio | Solvent | Total Adsorption Capacity For Mineral Oil % By Weight | Adsorption Capacity g/g |
|---|---|---|---|---|
| BMA/EGDM[1] | 1:4 | Hexane | 70.6% | 2.4 |
| BMA/EGDM[1] | 1:1.5 | Hexane | 70.6% | 2.4 |
| BMA/EGDM[1] | 1.5:1 | Hexane | 72.2% | 2.6 |
| BMA/EGDM[1] | 4:1 | Hexane | 54.5% | 1.2 |
| BMA/AMA/EGDM[2] | 1:4:6 | Heptane | 78.3% | 3.6 |
| MMA/EGDM[3] | 1:1.1 | — | 64% | 1.8 |

[1]Data taken from Table XIV of U.S. Pat. No. 4,962,133 as based upon particles that were prepared by particle precipitation in an azeotrope.
[2]Particle was produced by Example 1 of the present invention.
[3]Dow Corning Product No. 5640, having a reported mean diameter of about 25 microns.

EXAMPLE 1

In particular, 1.75 grams of Methocel A4C Premium was dissolved in 191.1 grams of water in a 2000 ml three-necked resin flask equipped with a stirrer, thermometer, condenser and argon purge. A solution of 17.53 grams of allyl methacrylate, 2.93 grams of butyl methacrylate, 38.23 grams of monoethylene glycol dimethacrylate, 81.07 grams of n-heptane solvent and 0.73 grams of VAZO 52 was bubbled with argon for 10 minutes. The resultant mix was slowly added to the 1,500 rpm stirred aqueous solution of the Methocel at 23° C. under argon. The temperature was raised to 46° C. with constant agitation when precipitation started. Massive polymerization was observed at 53° C. The reaction mixture was then heated to 75° C. and that temperature was held for an additional six hours. Thereafter, the reaction mixture was subjected to steam distillation to remove the heptane and residual monomers. The terpolymer beads were separated from the reaction mixture by filtration. The separated terpolymer beads were washed with deionized water and dried in an oven at 60° C. The dried terpolymer was an odorless white soft powder having a total sorption capacity (i.e., "adsorption capacity" in the art) for light mineral oil of 78.3% by weight, a mole ratio of butyl methacrylate: allyl methacrylate: monoethylene glycol dimethacrylate of about 1:4:6.1, and a corresponding ratio weight percent of 5:30:65.

EXAMPLE 2

Example 1 was repeated except that ratio in weight percent of the referenced monomers was 8:27:65 respectively. The total sorption capacity was comparable to the value obtained in the prior example.

EXAMPLE 3

Example 1 was repeated except that methyl methacrylate was used instead of allyl methacrylate. The total sorption capacity for mineral oil of the resultant terpolymer was 73.7% by weight.

EXAMPLE 4

Example 1 was repeated except that dibenzoyl peroxide replaced VAZO 52 as the initiator. The total sorption capacity for light mineral oil of the resultant terpolymer was 74% by weight.

EXAMPLE 5

Example 1 was repeated. The total sorption capacity for light mineral oil of the resultant product was found to be 78% by weight.

EXAMPLES 6–11

Example 1 was repeated except that the weight percent ("W %") ratio of monomers was as follows:

| BMA (W %) | AMA (W %) | EGDMA (W %) | Total Adsorption Capacity (mineral oil) % By Weight | Adsorption Capacity gm. oil/gm. polymer |
|---|---|---|---|---|
| 5 | 30 | 65 | 78.3 | 3.60 |
| 7.5 | 27.5 | 65 | 78.1 | 3.56 |
| 10 | 25 | 65 | 78.2 | 3.58 |
| 15 | 20 | 65 | 78.1 | 3.56 |
| 20 | 15 | 65 | 78.1 | 3.56 |
| 25 | 10 | 65 | 78.0 | 3.55 |

What is claimed is:

1. A process for producing a microporous oleophilic and hydrophilic adsorbent copolymer comprising allyl methacrylate and an ethylene glycol dimethacrylate in a mole ratio of about 1 to 1.5–4 comprising the steps of:
   dissolving at least two polyunsaturated monomers including allyl methacrylate and an ethylene glycol dimethacrylate in a substantially water-immiscible organic solvent to provide a monomer mixture containing more than about 60% by weight polyunsaturated monomers;
   combining said monomer mixture with an aqueous solution to form a biphasic liquid system comprising a water-immiscible organic phase containing dissolved monomers and an aqueous phase;
   vigorously stirring said biphasic liquid system at a rate sufficient to cause said water-immiscible organic phase, containing said dissolved monomers, to be suspended as micro-droplets in said aqueous phase;
   polymerizing said monomers in said suspended micro-droplets during vigorous stirring to produce a microporous, copolymer micro-particle therein; and
   separating said microporous polymer micro-particle from said substantially water-immiscible organic solvent to produce a microporous oleophilic and hydrophilic adsorbent polymer micro-particle characterized by having a mean unit diameter of less than about 50 microns and having a total sorption capacity for mineral oil that is 72% by weight or greater, based on the total weight of copolymer plus mineral oil.

2. The process of claim 1, wherein one of said polyunsaturated monomers is an ethylene glycol dimethacrylate selected from the group consisting of monoethylene glycol dimethacrylate, diethylene glycol dimethacrylate, triethylene glycol dimethacrylate, and mixtures thereof.

3. The process of claim 2, wherein said ethylene glycol dimethacrylate is monoethylene glycol dimethacrylate.

4. The process of claim 3, wherein the mole ratio of allyl methacrylate:monoethylene glycol dimethacrylate of 4:6.

5. The process of claim 3, wherein said water immiscible solvent is an aromatic or aliphatic hydrocarbon.

6. The process of claim 5, wherein said substantially water immiscible organic solvent is a heptane.

7. The process of claim 6, wherein said heptane is n-heptane.

8. The process of claim 5, wherein said aqueous phase further includes a suspension stabilizer selected from the group consisting of starch, gum arabic, polyvinyl alcohol, sodium polymethacrylate, magnesium silicate, sodium bentonite, methyl cellulose, and mixtures thereof.

9. The process of claim 8, wherein said suspension stabilizer is a methylcellulose.

10. The process of claim 9 further including adding a polymerization initiator to said monomers.

11. The process of claim 1, wherein the monounsaturated monomers comprise about 9% by weight or less, based on the total weight of monomers in the organic phase.

12. The process of claim 11, wherein the monounsaturated monomers comprise 0% to about 5% by weight, based on the total weight of monomers in the organic phase.

13. The process of claim 10, wherein said polymerization initiator is an azo nitrile type initiator.

14. The process of claim 10, wherein the mean unit particle diameter is from about 1 to about 25 microns.

15. The process of claim 14, wherein the mean unit particle diameter is from about 1 to about 16 microns.

16. The process of claim 1, wherein said micro-particles are further characterized by having a particle size distribution wherein a majority of said micro-particles have a particle size between about 6.2 and about 32.7 microns.

17. The process of claim 1, wherein said micro-particles are further characterized by having a bulk density of about 0.02 to about 0.1 gram per cubic centimeter.

18. The process of claim 17, wherein said micro-particles are further characterized by having a bulk density of about 0.02 to about 0.07 gram per cubic centimeter.

19. The process of claim 18, wherein said micro-particles are further characterized by having a bulk density of about 0.03 to about 0.05 gram per cubic centimeter.

* * * * *

UNITED STATES PATENT AND TRADEMARK OFFICE
CERTIFICATE OF CORRECTION

PATENT NO. : 5,712,358
DATED : January 27, 1998
INVENTOR(S) : Milan F. Sojka

It is certified that error appears in the above-identified patent and that said Letters Patent is hereby corrected as shown below:

Column 5, line 6, "reelamine," should be -- melamine, --

Column 5, line 41, "alchols" should be -- alcohols --

Column 6, line 9, "mount" should be -- amount --

Column 7, line 59, "mines" should be -- amines --

Signed and Sealed this

Twenty-seventh Day of October, 1998

Attest:

BRUCE LEHMAN

*Attesting Officer*   *Commissioner of Patents and Trademarks*